United States Patent [19]

Barner

[11] Patent Number: 4,629,064

[45] Date of Patent: Dec. 16, 1986

[54] COMPOUND FOOD STORAGE BAG

[76] Inventor: Juliane S. Barner, 10 Russell Ave., Kentfield, Calif. 94904

[21] Appl. No.: 724,069

[22] Filed: Apr. 17, 1985

[51] Int. Cl.$^4$ ............... B65D 81/26; B65D 57/00
[52] U.S. Cl. .................... 206/204; 383/109; 383/113; 426/431
[58] Field of Search ............ 426/431; 428/35; 206/204; 383/109, 110, 111, 112, 113, 117, 100, 101

[56] References Cited

U.S. PATENT DOCUMENTS

| 2,536,834 | 1/1951 | Baker et al. | 229/55 |
| 4,034,118 | 7/1977 | Martin | 426/431 |
| 4,048,361 | 9/1977 | Valyi | 428/35 |
| 4,382,507 | 5/1983 | Miller | 206/204 |

Primary Examiner—Joseph Man-Fu Moy
Attorney, Agent, or Firm—Owen, Wickersham & Erickson

[57] ABSTRACT

An internally lined food storage bag useful in the storage of moisture-retentive foods such as fruits and vegetables. The storage bag comprises a hand-closed water-impermeable outer bag containing an absorbent inner bag. The inner bag is made of water absorbent paper or paper-like material attached at the bottom and in small areas (i.e., spots) only part of the way up the interior of the outer bag, thereby enabling separate closure.

1 Claim, 8 Drawing Figures

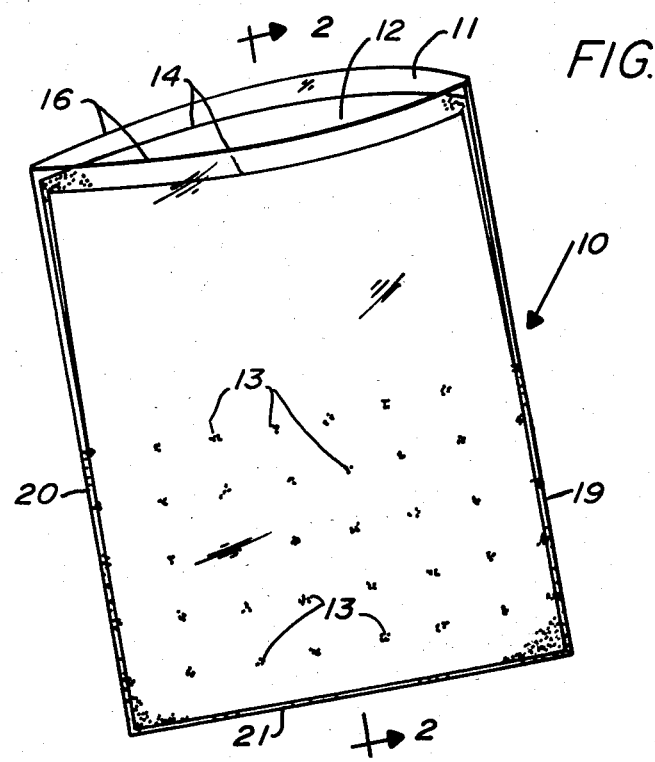
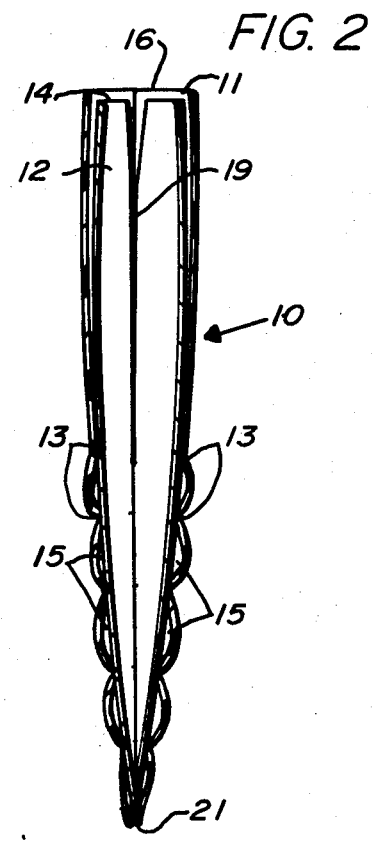
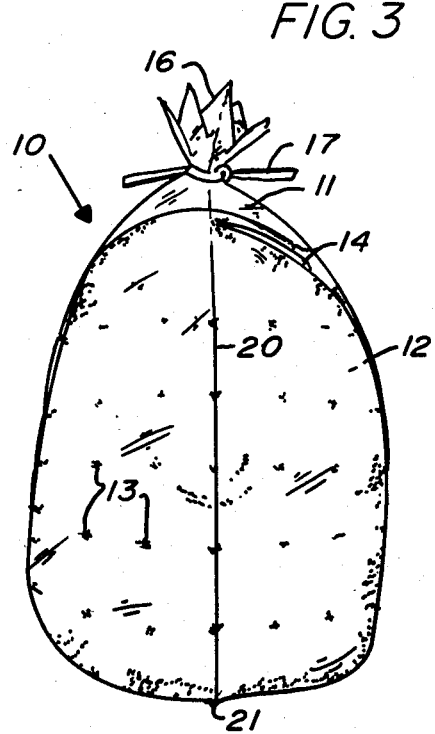

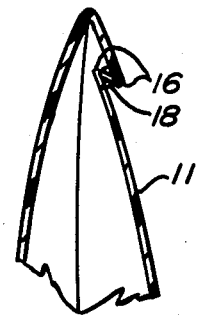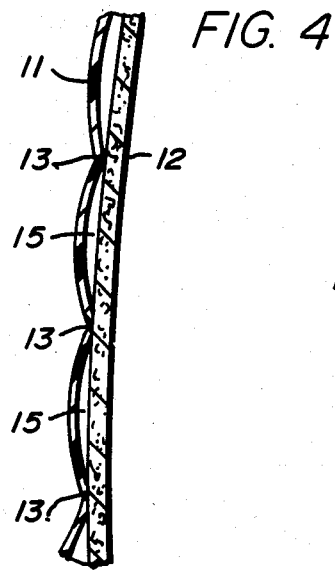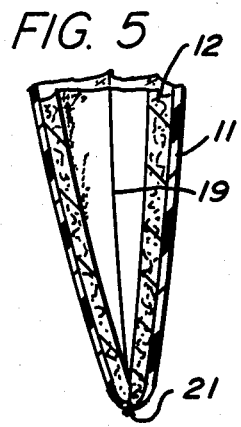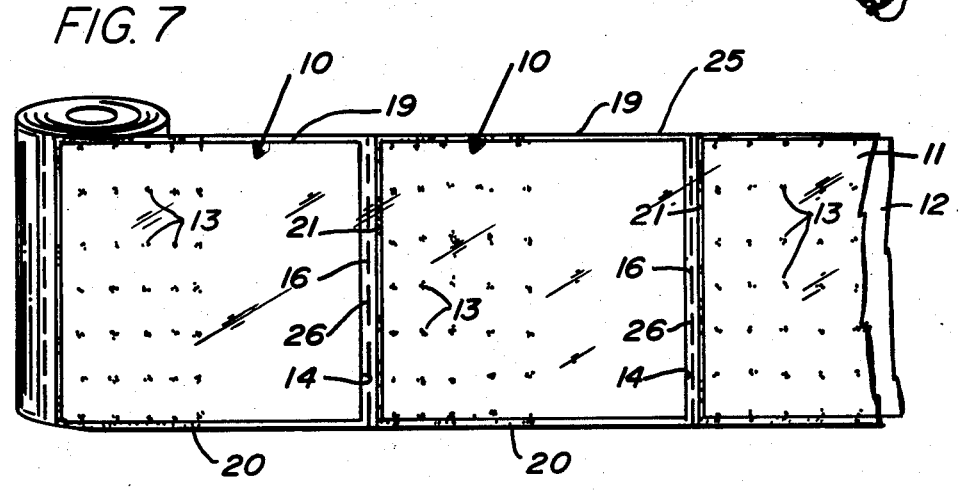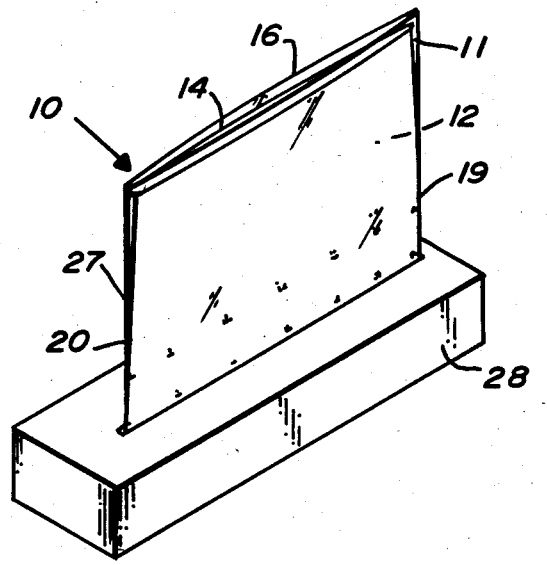

COMPOUND FOOD STORAGE BAG

BACKGROUND OF INVENTION

This invention relates to an improved storage container or bag for use with fresh vegetables, fruits and other moisture-retaining foods.

The storing of food has been a problem for centuries. The use of salt, ice and now refrigeration has largely alleviated the problem of bacterial growth and the subsequent spoiling of stored food. However, moist foods such as fruits and vegetables still have relatively brief shelf lives, even when stored in a refrigerator. Bacterial growth, discoloring, and drying out are often experienced in the storage and refrigeration of moist foods.

The art has developed both permeable and impermeable materials such as paper towels, wax paper, plastic, and aluminum foil to facilitate the storing of food. Yet, if an impermeable material such as a sealed plastic bag is used to store moist vegetables, any excess moisture in the sealed bag cultivates bacterial growth, which results first in discoloration and then spoilage of the food. If a permeable material is used to store moist produce, the pervious nature of the material lets the moisture escape, and the food becomes dehydrated.

In order to alleviate the problems of bacterial growth and dehydration of stored foods, some people use a paper towel in combination with foil or wax paper or enclose a paper towel in a plastic bag to package stored food. However, if the combination is impervious, condensation of exuded liquid from the food saturates the paper towel, thereby cultivating bacterial growth. Conversely, if the combination is permeable, moisture escapes and the stored food will dehydrate.

Accordingly, it is a principal object of this invention to provide bag-like container for storing produce which delays and reduces the problems of discoloring and spoiling resulting from bacterial growth within condensed or exuded moisture, thus prolonging both the usable life and the appearance of the stored food.

It is a further object of the present invention to provide a bag-like container which also serves to retain moisture, thus reducing dehydration of the stored food.

It is still a further object of the present invention to provide an inexpensive and convenient bag-like container for use by both consumers and packagers of moist fruit and vegetables.

SUMMARY OF THE INVENTION

The foregoing objects and advantages of the present invention are achieved in the embodiments illustrated herein. The present invention resides in the provision of a hand closed plastic outer bag surrounding an absorbent inner bag. The outer bag comprises a water impermeable material permanently joined at the bottom and sides thereof which can be repeatedly hand closed and re-opened. This closed outer bag best achieves an airtight environment to thereby prevent both bacteria from entering and moisture from escaping the storage bag.

The inner bag comprises one or several layers of a non-dissolving moisture absorbing paper or other material similar to the common paper towel. This inner bag absorbs moisture exuded from the stored food or condensed inside the closed bag, thereby inhibiting the cultivation of bacterial growth. Preferably, the inner bag is attached only minimally in very small areas to the interior of the outer bag. This method of construction allows for air pockets to lie between the interior of the outer bag and the inner bag, thereby inhibiting saturation of the inner bag due to condensation or exuded liquids. Saturation of the inner bag would preclude its absorbing function.

In operation, the absorbent inner bag also serves to retain moisture within the bag which considerably delays the dehydration of certain stored foods. Thus, depending on the type of food and the amount of moisture within the bag, the inner bag will absorb moisture and preclude an environment which cultivates bacterial growth, at the same time the inner bag will retain moisture to preclude an environment which will dehydrate the stored food. The present invention prolongs both the shelf-life and the appearance of stored fresh fruits and vegetables whether the environment would otherwise be too moist or too dry.

Critical to the structure of the present invention, is the attachment of the inner bag to the outer bag for only part of the way up the height of the outer bag. Preferably, the attachment is minimal or nearly so, with the bags joined at the bottom seam and in a polka-dot-like fashion up to half of the total height. This structure enables the inner bag to be closed separately from the outer bag. The two-stage closure of the storage bag has several advantages. Essentially, the two-stage closing process seals better to achieve a nearly airtight environment. However, if the food to be stored is extremely moist or perhaps is even warm and is giving off water vapor, the outer bag may be temporarily left open to allow the stored food to "breathe" thereby preventing excess condensation from collecting within the storage bag. Thus, one may conveniently store a variety of moist produce under various conditions so as to prolong both appearance and shelf life.

BRIEF DESCRIPTION OF THE DRAWINGS

The present invention will be more readily understandable from a consideration of the accompanying drawings in which:

FIG. 1 is a view in perspective of a hand sealable food storage bag which embodies the principles of the present invention.

FIG. 2 is a view in section taken along the line 2—2 of FIG. 1. The air pockets have been exaggerated somewhat.

FIG. 3 is a view in side elevation longitudinal sectional view of the bag of FIG. 1 shown in closed position.

FIG. 4 is a greatly enlarged fragmentary view in section of a portion of the bag showing the points of attachment between the inner and outer bag portions, with the air pockets between them somewhat exaggerated.

FIG. 5 is a somewhat enlarged fragmentary, view in section of the bottom of the bag.

FIG. 6 is a similarly enlarged view in section of the top portion of the upper bag in a form having an adhesive lining.

FIG. 7 is a perspective view of a series of storage bags of FIG. 1 packaged in a rolled tear-away arrangement. The view is broken off at the right.

FIG. 8 is a perspective view of a storage bag of FIG. 1 being taken from a package of such bags in a carton with pull-up folding.

DESCRIPTION OF A PREFERRED EMBODIMENT

FIG. 1 shows a compound bag 10 embodying the present invention, wherein the hand sealable outer bag 11 contains an absorbent inner bag 12. The absorbent inner bag 12 may comprise several layers of a non-dissolving moisture absorbing material similar to ordinary paper towel. The inner bag 12 is interiorly attached to the outer bag 11 at the bottom and in a series of very small areas 13 and for only part of the way up the height of the bag 11, thereby enabling separate closure of the inner bag 12 at its upper end 14. This structure has the advantage of both achieving a more airtight environment, through a two-stage closing process, and enabling very moist or warm food to "breathe" by temporarily leaving the outer bag 11 open. Since the inner bag 12 is attached to the interior of the outer plastic bag 11 in small areas or spots 13, air pockets 15 lie in between the outer bag 11 and inner bag 12, thereby inhibiting the saturation of the inner bag 12 due to exuded moisture from the stored food or condensation within the storage bag 10; saturation of the inner bag 12 would preclude the absorbing function of the paper material of which it is constructed.

The hand closed impermeable outer bag 11 may, as shown in FIG. 2, be hand sealable at its upper end 16 by means of a closing strip 17 (FIG. 3), closing tab 18 (FIG. 6), or, if desired, interlocking hard plastic ridges which can be pressed together to seal the bag 11 and pried or pulled apart to reopen the bag. The outer bag 11 is permanently bonded together at its sides 19 and 20 (FIG. 1), and at its bottom 21.

In the inner bag 12 the layers of moisture absorbing paper material are preferably separated from the interior of the outer bag 11 by pockets 15 of air as shown in FIGS. 2 and 4.

FIGS. 7 and 8 illustrate two different methods of packaging the present invention. FIG. 7 shows a tear-away roll arrangement 25, similar to a paper towel roll, which may be used at home or made available to shoppers in super markets. The storage bags 10 may be mass produced by sandwiching side-joined layers of the absorbent material as bags 12 between a pair of sheets of the water impermeable material, cut fractionally wider than the absorbing inner bag 12, bonding the edges 19, 20 and 21 together and then perforating the impermeable material along a line 26 between the top and bottom of successive bags 10.

FIG. 8 shows a pull-up folding arrangement 27 stored within a box dispenser 28 similar to or sandwich bag dispensers. In this manner the bags 10 are readily available to the user at home one by one.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A food storage bag for storing moist fruits and vegetables in a manner minimizing bacterial growth and delaying the dehydration of stored food, comprising:
    an outer bag portion comprised of water-impermeable plastic closable at the top thereof, and
    an absorbent inner bag portion comprised of non-dissolving paper toweling permanently attached to said outer bag portion,
    said inner bag portion being attached half the height of said outer bag portion thereby enabling separate closure thereof,
    said inner bag portion also being fractionally attached to the interior of said outer bag portion by a polka dot pattern so that air pockets lie between said inner bag portion and said outer bag portion.

* * * * *